July 18, 1939.  J. P. BURKE  2,166,679
COMBUSTION CHAMBER FOR AN INTERNAL COMBUSTION ENGINE
Filed March 8, 1938
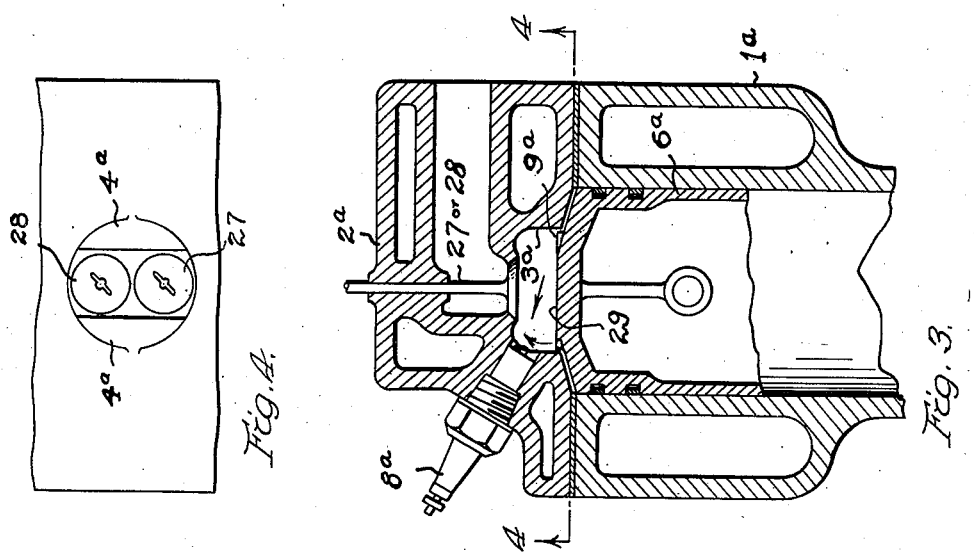
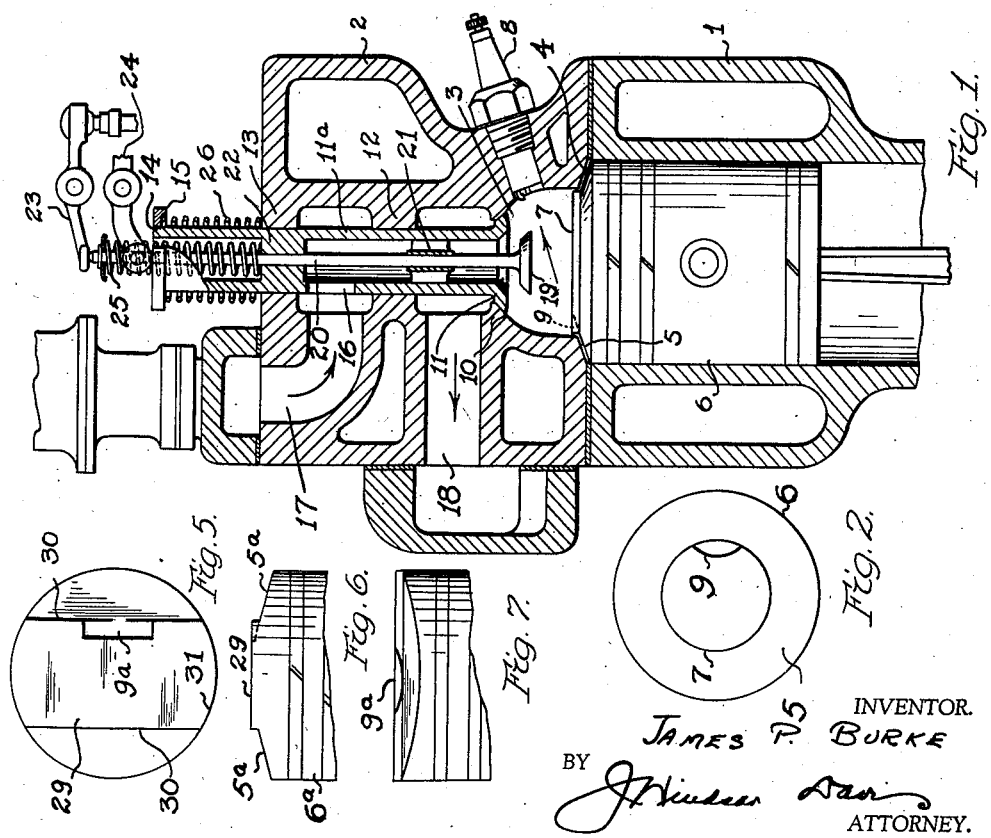
INVENTOR.
JAMES P. BURKE
BY
ATTORNEY.

Patented July 18, 1939

2,166,679

UNITED STATES PATENT OFFICE 2,166,679

COMBUSTION CHAMBER FOR AN INTERNAL COMBUSTION ENGINE

James P. Burke, Knoxville, Tenn., assignor of one-half to F. L. McLaughlin, Detroit, Mich.

Application March 8, 1938, Serial No. 194,638

9 Claims. (Cl. 123—191)

This invention relates to internal combustion engines, particularly of the overhead valve type and has for its object to provide improved combustion space formed by coaction of the piston and cylinder head combustion chamber.

Another object is to provide a combustion chamber of dome shape coaxial with its cylinder but of smaller bottom plan view and having downwardly and outwardly inclined lower side walls whereby the fuel charge undergoing compression is forced into the upper part or dome of the chamber with increasing turbulance as the compression stroke of the piston nears completion.

A further object is to provide a piston having a top formed with upwardly and inwardly inclined side walls capable of coacting with the lower walls of the combustion chamber to increase the turbulent effect in the dome.

A further object is to provide a piston top as above described having a cylindrical portion above its inclined walls adapted to coact with the lowermost portion of the dome of the combustion space between the inclined walls of the piston and combustion space between the inclined walls of the piston and combustion chamber from the dome at the time of initial burning of the fuel charge.

A still further object is to provide a piston as above described capable of directing a turbulent blast of fuel undergoing compression directly toward the spark plug which is located in the dome. As will become hereinafter more fully apparent this entails a cutting away of a portion of the cylindrical top of the piston at the side of the cylinder opposed to the spark plug.

Another object is to provide a valve gear which can be located in the ideal type of combustion space as above described without requiring alteration of the shape thereof.

More particularly it is an object to provide coaxial inlet and outlet valves with the seat of the inlet valve in the head of the outlet valve whereby a heat exchange between the hot exhaust valve and the cool oncoming fuel charge takes place to their mutual advantage.

A further object is to reveal my improved piston and combustion chamber adapted for use with a conventional valve gearing.

Other objects and advantages will be more apparent as reference is had to the accompanying drawing wherein:

Figure 1 is a vertical section diametrically through an engine cylinder and cylinder head constructed according to my invention and with my improved valve gearing.

Figure 2 is a top plan view of the piston of Figure 1.

Figure 3 is a section similar to Figure 1 showing my improved combustion chamber and piston with conventional valve gearing.

Figure 4 is a bottom plan view of the valve gearing taken along the line 4—4 of Figure 3, Figure 5 is a top plan view of the piston of Figure 4, Figure 6 is a side elevation of the piston of Figure 4, and Figure 7 is a side elevation of the piston of Figure 4 taken after a ninety degree rotation thereof.

More particularly, 1 indicates a cylinder having a cylinder head 2 in which a combustion chamber 3 of dome shape in any vertical cross section is formed, this chamber terminating in outwardly and downwardly inclined wall portions 4 which parallel inwardly and upwardly inclined wall portions 5 forming a part of the top of a piston 6. The walls 5 of the piston terminate at their upper end in cylindrical walls 7 which parallel the lower portion of the dome 3.

As the piston 6 travels upwardly on its compression stroke the fuel charge is compressed with increasing turbulence. As the piston approaches its uppermost position the turbulence becomes violent as the fuel is squeezed from between the walls 4 and 5. The spark plug 8 is located in the side walls of the combustion chamber 3 and in order that the gases undergoing compression may be given direction toward the plug the piston walls 7 are cut away at 9, opposite the plug. The axis of the plug is approximately parallel to the inclination of the wall 5 at its line of nearest approach as is also the bottom of the cut out 9. The cylindrical walls 9 parallel the lower walls of the dome 3 and coact therewith to cut off the space between the walls 4 and 5 during initial burning of the fuel charge. There is a slight clearance between the walls 9 and the walls of the dome 3 but it is preferably less than the minimum distance between the walls 4 and 5.

The combustion chamber is open at the top of the dome 3 to form a seat 10 for the exhaust valve 11, this valve being hollow with its stem 11a extending through a wall 12 in close fitting engagement and also through the top cylinder head wall 13, terminating outwardly of the head in a threaded end 14 onto which is screwed a cap 15. The stem 11a has an opening 16 there-through which constitutes an inlet port and which resides in the inlet passage 17. The wall 12 separates the passage 17 from the outlet passage 18 which is uncovered to the combustion chamber when the valve 11 is unseated.

Coaxial with the valve 11 and stem 11a is an inlet valve 19 having a stem 20 which extends upwardly through the valve guides 21 and 22 within the stem 11a and outwardly through the cap 15. When the valve 11 is seated and the valve 19 is unseated the combustion chamber is open to the inlet passage 17.

In order to actuate the valves 11 and 19 I provide two rocker arms 23 and 24 operated in conventional manner by a cam shaft, not shown. The outer end of the arm 23 contacts the upper end of the stem 20 for depression thereof to unseat the valve 19, the valve being returned to seating position by a spring 25 which acts at one end against the valve stem and reacting at its other end against the valve guide 22. The pushrod 24 at its outer end contacts the cap 14 and, upon actuation, depresses the stem 11a thus unseating the valve 11. A spring 26 acting against the cap 15 at one end and reacting against the wall 13 at its other end returns the valve 11 to its seat.

In Figures 3 to 7 inclusive, the invention is adapted to conventional valve gearing. In this case, the combustion chamber 3a is distorted out of a pure dome shape in order to accommodate an inlet valve 27 and an outlet valve 28 arranged side by side in the head 2a. This chamber is elongated in one direction as indicated in Figure 4, and the outwardly and downwardly inclined side walls 4a extend only from the longer sides thereof.

The piston 6a has upwardly and inwardly extending top walls 5a substantially in counterpart of the walls 4a and terminating in a top 29 having vertical mutually parallel side walls 30 and rounded vertical end walls 31 in extension of the piston walls therebelow. The top 29 has a cut out 9a through the walls 30 opposite the spark plug 8a.

The operation and action of this latter form of combustion chamber is essentially the same as that previously described.

Numerous adaptations of my invention will suggest themselves to one skilled in the art and I therefore desire to be extended protection as defined by the appended claims.

What I claim is:

1. A combustion chamber for an engine cylinder having a piston therein comprising a lower portion of frusto conical shape in any vertical section taken transversely of the wrist pin of the piston, substantially vertical sidewalls arising from the small base of the frusto cone and terminating in a top portion curved in any vertical section, said chamber being of substantially equal diameter with the diameter of the cylinder in a diametric vertical section containing the axis of said wrist pin, and substantially vertical side walls extending from said top portion down to the top of said cylinder between the side walls of said frusto cone.

2. A piston for an engine cylinder having a wrist pin and a top portion of substantially frusto conical shape with vertical walls rising from the smaller base thereof in any section taken transversely of said wrist pin, said top being rectangular in a vertical section containing the axis of said wrist pin.

3. A piston for an engine cylinder having a top of frusto conical shape and a cylindrical portion arising from the smaller base of the frusto cone, a relatively small portion of said cylindrical portion being cut away to the depth of the frusto cone and having a bottom wall in direct continuation of the adjacent wall of the frusto cone.

4. A piston for an engine cylinder having a wrist pin and a top portion of substantially frusto conical shape in any vertical section taken transversely of said wrist pin and rectangular in vertical section containing the wrist pin with vertical walls arising from the smaller base of the frusto cone, a relatively small portion of one of said vertical walls being cut away.

5. The combination as set forth in claim 2 wherein a part of one of said vertical walls is cut away near the mid portion thereof.

6. A piston for an engine cylinder having a top of frusto conical shape and a cylindrical portion arising from the smaller base of the frusto cone, said cylindrical portion having a tapered groove in the surface thereof with the base of the groove paralleling the adjacent element of the frusto cone.

7. A combustion chamber for an engine cylinder comprising a frusto conical lower portion and a rounded upper portion arising from the upper base of said lower portion, and a spark plug extending through said rounded portion, said spark plug being inclined to the extent that the axis thereof parallels an element of the frusto cone, said rounded upper portion having a groove with the base of the groove paralleling the said element of the frusto cone and substantially in alignment with the axis of the spark plug.

8. A combustion space for an engine having a piston with a wrist pin comprising a combustion chamber having lower walls frusto conical in a vertical section transverse to said wrist pin and substantially rectangular in a section containing the wrist pin and substantially vertical wall portions arising from the smaller base of the frusto-cone and a piston top also frusto conical in a vertical section transverse to said wrist pin and rectangular in a section containing the wrist pin with vertical walls rising from the smaller base thereof, the side walls of the combustion chamber frusto-cone paralleling the side walls of the piston top.

9. The combination of a combustion chamber for an engine cylinder having a top portion substantially symmetric about any vertical plane bisecting the cylinder, said top portion terminating in outwardly and downwardly flared wall portions and a piston in the cylinder having a top with inclined walls paralleling said flared wall portions and terminating in substantially vertical walls forming a projection on said top, an ignition device in one side of said chamber, and a notch in the side of the piston remote from the spark plug, said notch being formed in continuation of the inclined piston wall and being directed toward said spark plug.

JAMES P. BURKE.